United States Patent [19]

Phipps, Jr. et al.

[11] 4,124,561
[45] Nov. 7, 1978

[54] REINFORCED THERMOPLASTIC POLYESTER COMPOSITIONS HAVING IMPROVED SHATTER RESISTANCE

[75] Inventors: Donald L. Phipps, Jr., Mt. Vernon; Allen D. Wambach, Evansville, both of Ind.

[73] Assignee: General Electric Company, Pittsfield, Mass.

[21] Appl. No.: 747,473

[22] Filed: Dec. 6, 1976

[51] Int. Cl.$^2$ ............................ C08K 3/34; C08K 3/40
[52] U.S. Cl. .................................................. 260/40 R
[58] Field of Search ................................ 260/40 R, 40

[56] References Cited

U.S. PATENT DOCUMENTS 3,824,209  7/1974  Anderson ........................... 260/40 R
3,859,246  11/1975  Jackson et al. ..................... 260/40 R
3,953,394  4/1976  Fox et al. .......................... 260/873 X Primary Examiner—Sandra M. Person
Attorney, Agent, or Firm—Morgan, Finnegan, Pine, Foley & Lee

[57] ABSTRACT

Reinforced thermoplastic compositions are provided which comprise a high molecular weight polyester and a mineral reinforcing filler comprising mica, talc or mixtures thereof in combination with a glass fiber reinforcement. The use of glass fibers together with the mineral reinforcement provides shatter resistance and further enhances other physical properties, such as tensile strength, modulus, impact strength and heat distortion temperature. Self-extinguishing embodiments are also disclosed.

18 Claims, No Drawings

REINFORCED THERMOPLASTIC POLYESTER COMPOSITIONS HAVING IMPROVED SHATTER RESISTANCE

This invention relates to reinforced shatter resistant thermoplastic polyester compositions. More particularly, it pertains to compositions comprising a high molecular weight polyester and a reinforcement therefor comprising fibrous glass in combination with mica, talc or a mixture of mica and talc. The compositions of this invention possess improved shatter resistance in comparison with corresponding mineral reinforced polyester compositions without glass fibers. In addition, enhancements in tensile and flexural properties, impact strength, heat distortion temperature, and resistance to warpage are also obtained with the present compositions.

BACKGROUND OF THE INVENTION

Minerals are currently being used to modify and reinforce various polymers. For instance, minerals such as silica (amorphous or crystalline), aluminum silicate, calcium metasilicate, talc, and the like, are added to thermoplastic polymers to enhance stiffness, heat resistance, strength, and to reduce shrinkage and to reduce the cost of the more expensive polymers. However, a major disadvantage of such mineral/polymer composites is that fabricated parts generally exhibit brittleness and there is, correspondingly, an alarming tendency for such parts to shatter when subjected to a sudden impact loading, regardless of the inherent toughness of the unreinforced polymer. The shattered part is rendered useless and, in general, is not repairable. On the other hand, if the plastic material had built-in shatter resistance, in many cases the impact loading would serve only to crack the part or merely result in the puncture of a small hole. In such cases, the damaged part could be repaired by standard patching procedures.

It has now been discovered that the use of glass fibers in thermoplastic compositions of high molecular weight polyesters which are reinforced with talc or mica significantly improves the shatter resistance of molded parts comprising such compositions. In addition, improvements in other properties, e.g., tensile strength, elongation, modulus, impact strength and heat distortion temperature, are also obtained.

DESCRIPTION OF THE INVENTION

According to this invention, there are provided reinforced, shatter resistant thermoplastic compositions useful for molding, e.g., injection molding, compression molding, transfer molding, and the like, the compositions comprising:

(a) a high molecular weight polyester resin; and (b) a reinforcing agent therefor comprising (i) a mineral reinforcement filler comprising mica, talc or a mixture thereof and in combination therewith (ii) glass fibers, the reinforcing agent (b) being present in an amount at least sufficient to reinforce the composition and the glass fibers (b)(ii) being present in an amount at least sufficient to provide improved shatter resistance in comparison with a corresponding composition wherein the reinforcing material consists essentially of said mineral filler.

The high molecular weight normally flammable polyesters used in the present compositions are polymeric glycol esters of terephthalic acid and isophthalic acids. They are available commercially or can be prepared by known techniques such as by the alcoholysis of esters of the phthalic acid with a glycol and subsequent polymerization, by heating glycols with the free acids or with halide derivatives thereof, and similar processes. These are described in Whinfield et al, U.S. Pat. No. 2,465,319 and in Pengilly, U.S. Pat. No. 3,047,539, incorporated herein by reference, and elsewhere.

Although the glycol portion of the polyester can contain from two to ten carbon atoms, it is preferred that it contain from two to four carbon atoms in the form of linear methylene chains.

Preferred polyesters will be of the family consisting of high molecular weight, polymeric glycol terephthalates or isophthalates having repeating units of the general formula:

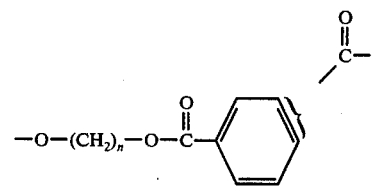

wherein $n$ is a whole number of from two to four, and mixtures of such esters, including copolyesters of terephthalic and isophthalic acids of up to about 30 mole % isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terepthalate).

Illustratively, high molecular weight polyesters will have an intrinsic viscosity of at least about 0.4 deciliters/gram and preferably, at least 0.7 deciliters/gram as measured in a 60:40 phenol/tetrachloroethane mixture at 30° C. At intrinsic viscosities of at least about 1.1 deciliters/gram, there is a further enhancement in toughness of the present compositions.

Especially useful when high melt strength is important are branched high melt viscosity poly(1,4-butylene terephthalate) resins, which include a small amount, e.g., up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or, preferably, polyols, and especially preferably, tetrols, such as pentaerythritol; triols, such as trimethylolpropane; or dihydroxy carboxylic acids and hydroxydicarboxylic acids and derivatives, such as dimethyl hydroxyterephthalate, and the like.

The branched poly(1,4-butylene terephthalate) resins and their preparation are described in Borman, U.S. Pat. No. 3,953,404, incorporated herein by reference.

The choice of the mineral filler of component (b) will be limited to talc, mica or a mixture thereof.

The filamentous glass to be employed as reinforcement in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrial properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (one-eighth) inch.

The amount of the reinforcing agent (b) can vary widely, it being essential only that mineral filler (b)(i) and glass fibers (b)(ii) are present in an amount at least sufficient to provide reinforcement, and that in addition to this limitation, glass fibers (b)(ii) are present in an amount at least sufficient to provide improved shatter resistance. In preferred compositions, reinforcing agent (b) comprises from about 5 to about 60, more preferably, from about 10 to about 50% by weight of mineral reinforcement (b)(i), and from about 2 to about 60, more preferably, from about 5 to about 50% by weight of glass fibers (b)(ii).

Other ingredients, such as flame retardants, drip retardants, pigments, dyes, stabilizers, plasticizers, and the like, can also be included.

Special mention is made of flame retardant additives consisting of aromatic carbonate homopolymers having repeating units of the formula:

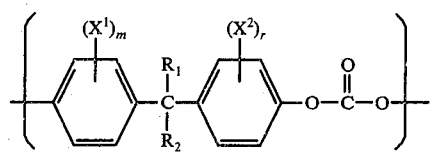

wherein $R^1$ and $R^2$ are hydrogen, (lower)alkyl or phenyl, $X^1$ and $X^2$ are bromo or chloro and $m$ and $r$ are from 1 to 4. These materials may be prepared by techniques well known to those skilled in the art. Also preferred are aromatic carbonate copolymers in which from 25 to 75 weight percent of the repeating units comprise chloro- or bromo-substituted dihydric phenol, glycol or dicarboxylic acid units. See, e.g., A. D. Wambach, U.S. Pat. No. 3,915,926, above-mentioned.

An especially preferred flame retardant agent will comprise an aromatic carbonate copolymer of tetrabromobisphenol-A and bisphenol-A, preferably in a 50:50 ratio, in combination with an organic or inorganic antimony containing compound, e.g., antimony oxide, prepared as described in U.S. Pat. No. 3,915,926, Procedure A, suitably modified.

The amount of flame retardant additive, if used, is not critical to the invention, so long as it is present in a minor proportion based on said composition — major proportions will detract from physical properties — but at least sufficient to render the polyester resin non-burning or self-extinguishing. Those skilled in the art are well aware that the amount will vary with the nature of the resin and with the efficiency of the additive. In general, however, the amount of additive will be from 0.5 to 50 parts by weight per 100 parts of resin.

The compositions of this invention can be prepared by a number of procedures. In one way, the reinforcing agent, e.g., mica or talc and glass fibers, are put into an extrusion compounder with the polyester resin to produce molding pellets. The reinforcing agent is dispersed in a matrix of the polyester resin in the process. In another procedure, the reinforcing agent (b) is mixed with the polyester resin by dry blending, then either fluxed on a mill and comminuted, or they are extruded and chopped. The reinforcing agent can also be mixed with the powdered or granular polyester and directly molded, e.g., by injection or transfer molding techniques.

It is always important to thoroughly free all of the ingredients; resin, reinforcement and any optional, conventional additives from as much water as possible.

In addition, compounding should be carried out to ensure that the residence time in the machine is short; the temperature is carefully controlled; the friction heat is utilized; and an intimate blend between the resin and the reinforcement is obtained.

Although it is not essential, best results are obtained if the ingredients are pre-compounded, pelletized and then molded. Pre-compounding can be carried out in conventional equipment. For example, after carefully pre-drying the polyester resin and the reinforcing agent, e.g., under vacuum at 100° C. for 12 hours, a single screw extruded is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 460° F.

The pre-compounded composition can be extruded and cut up into molding compounds such as conventional granules, pellets, etc. by standard techniques.

The compositions can be molded in any equipment conventionally used for glass-filled thermoplastic compositions. For example, with poly(1,4-butylene terephthalate), good results will be obtained in an injection molding machine, e.g., of the Newbury type with conventional cylinder temperatures, e.g., 450° F. and conventional mold temperatures, e.g., 150° F. On the other hand, with poly(ethylene terepthalate), because of the lack of uniformity of crystallization from interior to exterior of thick pieces, somewhat less conventional but still well-known techniques can be used. For example, a nucleating agent such as graphite or a metal oxide, e.g., ZnO or MgO can be included and standard mold temperature of at least 230° F. will be used.

DESCRIPTION OF THE PREFERRED EMBODIMENTS

The following examples illustrate the invention. They are set forth as a further description and are not to be construed as limiting the invention thereto.

EXAMPLES 1-2

Dry blends of poly(1,4-butylene terephthalate), intrinsic viscosity 0.92 dl./g., mica, 3/16 inch long glass fibers, and a stabilizer (diphenyl decyl phosphite, Ferro 904) are compounded and extruded. The extrudate is pelletized and injection molded into test pieces at 480° F. (mold temperature 130° F.), and the test pieces are evaluated for physical properties. The formulations and test results are shown in Table 1.

TABLE 1.

Compositions of poly(1,4-butylene terephthalate), mica, fibrous glass and antioxidant

| EXAMPLE | 1 | 2 |
|---|---|---|
| Ingredients (parts by weight) | | |
| poly(1,4-butylene terephthalate) | 79 | 79 |
| mica (K-1) | 10 | — |
| mica (less than 325 mesh) | — | 10 |
| glass fibers, 3/16 inch | 11 | 11 |
| stabilizer | 0.05 | 0.05 |
| Properties | | |
| Heat Distortion Temp., ° F. | | |
| 264 psi | 368/370 | 386/378 |
| Notched Izod impact, ft.lbs./in. | 0.88 | 0.99 |
| Unnotched Izod impact, ft.lbs./in. | 6.8 | 8.7 |
| Flexural strength, psi | 19,700 | 20,700 |
| Flexural modulus, psi | 704,000 | 750,000 |

EXAMPLES 3-4

Compositions of poly(1,4-butylene terephthalate) resin, mica, glass fibers, stabilizer (Ferro 904) and a minor amount of silicone are prepared as in Examples 1-2. The formulations and test results are summarized in Table 2. Unless otherwise indicated, amounts are in parts by weight.

TABLE 2.

Compositions of poly(1,4-butylene terephthalate, mica, fibrous glass, antioxidant and silicone

| EXAMPLE | 3 | 4 |
|---|---|---|
| Ingredients | | |
| poly(1,4-butylene terephthalate) | 79 | 79 |
| mica (K-1) | 10 | — |
| mica (less than 325 mesh) | — | 10 |
| glass fibers, 3/16 inch | 11 | 11 |
| stabilizer | 0.05 | 0.05 |
| silicone* | 0.20 | 0.20 |
| Properties | | |
| Heat Distortion Temp., ° F. | | |
| 264 psi | 376/378 | 365/376 |
| Notched Izod impact, ft.lbs./in. | 1.0 | 0.96 |
| Unnotched Izod impact, ft.lbs./in. | 7.6 | 8.2 |
| Flexural strength, psi | 20,200 | 19,700 |
| Flexural modulus, psi | 771,000 | 700,000 |

*amount silicone in units of weight percent, based on weight of mica

EXAMPLES 5-6

Dry blends of poly(1,4-butylene terephthalate), 3/16 inch glass fibers, mica or talc and a minor amount of stabilizers are compounded, extruded, pelletized and injection molded at 480° F., mold temperature 130° F. The formulations and properties are shown in Table 3.

TABLE 3.

Compositions of poly(1,4-butylene terephthalate, glass fibers, mineral reinforcement and stabilizers

| EXAMPLE | 5 | 6 |
|---|---|---|
| Ingredients | | |
| poly(1,4-butylene terephthalate) | 54.8 | 54.8 |
| mica | — | 40 |
| talc | 40 | — |
| glass fibers, 3/16 inch | 5 | 5 |
| stabilizers* | 0.20 | 0.20 |
| Properties | | |
| Heat Distortion Temp., ° F. | | |
| 264 psi | 350 | 358 |
| 66 psi | 413 | 408 |
| Warpage, mm | | |
| room temp. | 0 | 0 |
| 350° F./30 minutes | 0 | 0 |
| Notched Izod impact, ft.lbs./in. | 0.6 | 0.6 |
| Unnotched Izod impact, ft.lbs./in. | 4.1 | 4.4 |
| Flexural strength, psi | 13,881 | 15,467 |
| Flexural modulus, psi | 954,769 | 1,145,723 |
| Ultimate elongation, % | 2.5 | 3.6 |
| Tensile strength, psi | 9,024 | 9,536 |

*Ferro 904/Irganox 1093, 0.05/0.15

EXAMPLES 7-10

Following the procedure described in Examples 1 and 2, compositions of poly(1,4-butylene terephthalate), 3/16 inch glass fibers, mica or talc, stabilizers and, in Examples 8 and 10, a segmented thermoplastic copolyester are prepared, molded and evaluated for physical properties. The formulations and test results are summarized in Table 4. All amounts are in parts by weight.

TABLE 4.

| EXAMPLE | 7 | 8 | 9 | 10 |
|---|---|---|---|---|
| Ingredients | | | | |
| poly(1,4-butylene terephthalate) | 63.7 | 53.7 | 63.7 | 53.7 |
| glass fibers, 3/16 inch | 11.0 | 11.0 | 11.0 | 11.0 |
| talc | 25.0 | 25.0 | — | — |
| mica | — | — | 25.0 | 25.0 |
| copolyester* | — | 10.0 | — | 10.0 |
| stabilizers** | 0.20 | 0.20 | 0.20 | 0.20 |
| Properties | | | | |
| Heat Distortion Temp., ° F. | | | | |
| 264 psi | 393 | 376 | 370 | 384 |
| Warpage, mm | | | | |
| room temp. | 3 | 1 | 5 | 1 |
| 350° F./30 minutes | 15 | 11 | 11 | 8 |
| Notched Izod imp., ft.lbs./in. | 0.98 | 1.30 | 0.98 | 1.22 |
| Unnotched Izod imp., ft.lbs./in. | 7.24 | 8.94 | 7.97 | 8.94 |
| Flexural strength, psi | 20,623 | 17,847 | 23,002 | 18,960 |
| Flexural modulus, psi | 716,077 | 660,994 | 1,074,115 | 818,373 |
| Tensile strength, psi | 11,136 | 19,792 | 12,160 | 10,240 |

*Hytrel 4055, Dupont Co.
**Ferro 904/Irganox 1093, 0.05/0.15

EXAMPLES 11-12

Dry blends of poly(1,4-butylene terephthalate), ⅛ inch long glass fibers, mica or talc, stabilizers and a flame retardant agent (a mixture of a 50:50 aromatic carbonate copolymer of tetrabromobisphenol A and bisphenol A and antimony oxide) are compounded and extruded. The extrudate is cut into pellets, injection molded at 480° F., mold temperature 130° F. and evaluated for mechanical and flame resistance properties.

The formulations and test results are summarized in Table 5.

TABLE 5.

Compositions of poly(1,4-butylene terephthalate), mineral reinforcement, fibrous glass, stabilizers and a flame retardant agent

| EXAMPLE | 11 | 11A* | 12 | 12A* |
|---|---|---|---|---|
| Ingredients | | | | |
| poly(1,4-butylene terephthalate) | 40.8 | 47.8 | 40.8 | 47.8 |
| glass fibers, 1/8 inch | 5 | 5 | 5 | 5 |
| mica | — | — | 40.0 | 40.0 |
| talc | 40 | 40 | — | — |
| stabilizers** | .20 | .20 | .20 | .20 |
| TBBPA: BPA copolymer | 10 | 5 | 10 | 5 |
| antimony oxide | 4 | 2 | 4 | 2 |
| Properties | | | | |
| Heat Distortion Temp., °F. | | | | |
| 264 psi | 355 | 375 | 358 | 387 |
| 66 psi | 410 | 420 | 414 | 409 |
| Warpage, mm | | | | |
| room temp. | 0 | 0 | 0 | 1 |
| 350° F./30 minutes | 0 | 1 | 1 | 1 |
| Notched Izod imp., ft.lbs./in. | 0.5 | 0.5 | 0.5 | 0.6 |
| Unnotched Izod imp., ft.lbs./in. | 3.6 | 3.6 | 3.7 | 3.4 |
| Flexural strength, psi | 14,674 | 13,881 | 16,657 | 18,640 |
| Flexural modulus, psi | 1,145,723 | 1,145,723 | 1,562,344 | 1,562,349 |
| Tensile strength, psi | 8,768 | 8,960 | 10,048 | 9,792 |
| V-O flammability rating, Underwriters Laboratories Bulletin No. 94 | V-O | drips and burns | drips, does not burn | drips and burns |

*Control
**Ferro 904/Irganox 1093, 0.05/0.15

Obviously, other modifications and variations of the present invention are possible in the light of the above teachings. It is therefore to be understood that changes may be made in the particular embodiments of the invention described which are within the full intended scope of the invention as defined by the appended claims.

I claim:

1. A reinforced, shatter-resistant thermoplastic composition comprising:
   (a) a high molecular weight polyester resin; and
   (b) a reinforcing agent therefor comprising (i) a mineral reinforcing filler comprising mica, talc or a mixture thereof, and in combination therewith (ii) glass fibers, said reinforcing agent (b) being present in an amount at least sufficient to reinforce the composition and said glass fibers (b)(ii) being present in an amount at least sufficient to provide improved shatter resistance in comparison with a corresponding composition wherein the reinforcing material consists essentially of said mineral filler.

2. A composition as defined in claim 1 wherein reinforcing agent (b) comprises from about 5 to about 60%. by weight of a mineral reinforcing filler and from about 2 to about 60% by weight of glass fibers, based on the combined weights of (a) and (b).

3. A composition as defined in claim 2 wherein the mineral reinforcing filler is present in an amount of from about 10 to about 50% by weight and the glass fibers are present in an amount of from about 5 to about 50% by weight based on the combined weights of (a) and (b).

4. A composition as defined in claim 1 wherein said polyester has an intrisic viscosity of at least about 0.4 deciliters per gram when measured in a solution in a 60:40 mixture of phenol and trichloroethane at 30° C.

5. A composition as defined in claim 6 wherein said polyester has an intrinsic viscosity of at least about 0.7 deciliters per gram when measured in a solution in a 60:40 mixture of phenol and trichloroethane.

6. A composition as defined in claim 1 wherein said polyester is selected from the group consisting of polymeric glycol terephthalate and isophthalate esters having repeating units of the formula:

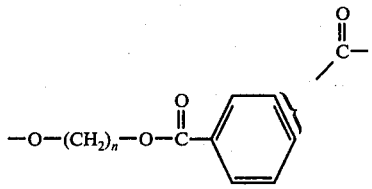

wherein n is a whole number of from two to four, and mixtures of such esters.

7. A composition as defined in claim 6 wherein said polyester is poly(1,4-butylene terephthalate).

8. A composition as defined in claim 1 wherein the mineral reinforcement (b)(i) is mica.

9. A composition as defined in claim 1 wherein the mineral reinforcement (b)(i) is talc.

10. A composition as defined in claim 1 which includes a flame retardant amount of a flame retardant agent.

11. A reinforced, shatter-resistant thermoplastic composition comprising:
   (a) a high molecular weight polyester resin; and
   (b) a reinforcing agent therefor comprising (i) mica and in combination therewith (ii) glass fibers, said reinforcing agent (b) being present in an amount at least sufficient to reinforce the composition and said glass fibers (b)(ii) being present in an amount at least sufficient to provide improved shatter resistance in comparison with a corresponding composition wherein the reinforcing material consists essentially of said mineral filler.

12. A composition as defined in claim 11 wherein reinforcing agent (b) comprises from about 5 to about 60% by weight of mica and from about 2 to about 60% by weight of glass fibers, based on the combined weights of (a) and (b).

13. A composition as defined in claim 12 wherein the mica is present in an amount of from about 10 to about 50% by weight and the glass fibers are present in an amount of from about 5 to about 50% by weight based on the combined weights of (a) and (b).

14. A composition as defined in claim 11 wherein said polyester has an intrisic viscosity of at least about 0.4 deciliters per gram when measured in a solution in a 60:40 mixture of phenol and trichloroethane at 30° C.

15. A composition as defined in claim 11 wherein said polyester has an intrinsic viscosity of at least about 0.7 deciliters per gram when measured in a solution in a 60:40 mixture of phenol and trichloroethane.

16. A composition as defined in claim 11 wherein said polyester is selected from the group consisting of polymeric glycol terephthalate and isophthalate esters having repeating units of the formula:

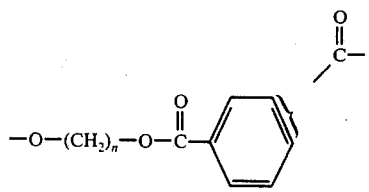
wherein $n$ is a whole number of from two to four, and mixtures of such esters.
17. A composition as defined in claim 16 wherein said polyester is poly(1,4-butylene terephthalate).
18. A composition as defined in claim 11 which includes a flame retardant amount of a flame retardant agent.
* * * * *